US010573455B2

(12) United States Patent
Hui et al.

(10) Patent No.: US 10,573,455 B2
(45) Date of Patent: Feb. 25, 2020

(54) WIRELESS POWER TRANSFER SYSTEM

(71) Applicant: The University of Hong Kong, Hong Kong (CN)

(72) Inventors: Shu Yuen Ron Hui, Hong Kong (CN); Cheng Zhang, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 19 days.

(21) Appl. No.: 15/355,978

(22) Filed: Nov. 18, 2016

(65) Prior Publication Data

US 2017/0140870 A1 May 18, 2017

Related U.S. Application Data

(60) Provisional application No. 62/256,726, filed on Nov. 18, 2015.

(51) Int. Cl.
*H01F 27/32* (2006.01)
*H01F 38/14* (2006.01)
(Continued)

(52) U.S. Cl.
CPC ............ *H01F 38/14* (2013.01); *H01F 27/24* (2013.01); *H01F 27/28* (2013.01); *H01F 27/32* (2013.01); *H02J 50/12* (2016.02)

(58) Field of Classification Search
CPC .......... H01F 27/32; H01F 38/14; H01F 27/24; H01F 27/28; H02J 50/12
See application file for complete search history.

(56) References Cited

U.S. PATENT DOCUMENTS 3,251,014 A * 5/1966 Stein, Jr. ............. H01B 17/005
174/139
5,124,642 A * 6/1992 Marx .................... G01R 15/18
174/139
(Continued)

FOREIGN PATENT DOCUMENTS

CN          102024533 B   *  7/2012
CN          103219806 A   *  7/2013     .............. H02J 17/00
(Continued)

OTHER PUBLICATIONS

Lee, et.al., "Magnetic Resonant wireless power delivery for distributed sensor and wireless system," Jan. 15-18, 2012, IEEE Topical Conference on Wireless Sensor and Sensor Networks, pp. 13-16.*
(Continued)

*Primary Examiner* — Pinping Sun
(74) *Attorney, Agent, or Firm* — Saliwanchik, Lloyd & Eisenschenk

(57) ABSTRACT

Novel and advantageous insulator discs with embedded resonator coils are provided. By linking the insulator discs in a series using an appropriate mechanical mechanism, the insulator discs form an insulator or insulator string for a high power transmission line system. The resonator coils embedded inside the insulator discs therefore form a series of relay resonators that can be used for wireless power transfer through the principle of near-field magnetic coupling and resonance. The insulator string can provide the simultaneous functions of voltage insulation and wireless power transfer over the length of the string. Applications include, but not limited to, wireless power transfer in a high-voltage environment such as that encountered in high-voltage power transmission line systems.

21 Claims, 5 Drawing Sheets

(51) Int. Cl.
  *H02J 50/12* (2016.01)
  *H01F 27/24* (2006.01)
  *H01F 27/28* (2006.01)

(56) References Cited

U.S. PATENT DOCUMENTS

| | | | | |
|---|---|---|---|---|
| 6,051,796 | A * | 4/2000 | Kuhl | H01B 17/02 174/177 |
| 8,432,125 | B2 * | 4/2013 | Takada | B60L 11/182 320/104 |
| 8,563,867 | B2 * | 10/2013 | Hyde | H01B 17/525 174/145 |
| 8,587,155 | B2 * | 11/2013 | Giler | B60L 11/182 307/104 |
| 9,685,826 | B1 * | 6/2017 | Bhatti | H02J 50/90 |
| 9,862,277 | B2 * | 1/2018 | Dames | B60L 5/005 |
| 2009/0058189 | A1 * | 3/2009 | Cook | H04B 5/0037 307/104 |
| 2009/0128262 | A1 * | 5/2009 | Lee | H01Q 7/00 333/219.1 |
| 2009/0153273 | A1 | 6/2009 | Chen et al. | |
| 2010/0201204 | A1 * | 8/2010 | Sakoda | H02J 5/005 307/104 |
| 2011/0101788 | A1 | 5/2011 | Sun et al. | |
| 2011/0279278 | A1 * | 11/2011 | Al-Absi | G01R 31/1245 340/584 |
| 2012/0013198 | A1 * | 1/2012 | Uramoto | H02J 5/005 307/104 |
| 2012/0248890 | A1 * | 10/2012 | Fukushima | B60L 11/182 307/104 |
| 2013/0093390 | A1 * | 4/2013 | Partovi | H02J 7/025 320/108 |
| 2013/0285269 | A1 * | 10/2013 | Kim | B29C 45/14754 264/40.1 |
| 2014/0015470 | A1 * | 1/2014 | Lim | H02J 7/35 320/101 |
| 2014/0021794 | A1 * | 1/2014 | Kim | H01F 38/14 307/104 |
| 2014/0028112 | A1 | 1/2014 | Hui et al. | |
| 2015/0061591 | A1 * | 3/2015 | Armstrong | H02J 7/025 320/108 |
| 2015/0108945 | A1 * | 4/2015 | Yan | H02J 7/0042 320/108 |
| 2015/0130288 | A1 * | 5/2015 | Ichikawa | H01F 38/14 307/104 |
| 2015/0171519 | A1 * | 6/2015 | Han | H01Q 1/38 343/720 |
| 2015/0228402 | A1 | 8/2015 | Zhong et al. | |
| 2016/0043571 | A1 * | 2/2016 | Kesler | H02J 50/12 307/104 |
| 2016/0191123 | A1 * | 6/2016 | Mukherjee | H04B 5/0087 375/300 |

FOREIGN PATENT DOCUMENTS

| | | | |
|---|---|---|---|
| CN | 103443883 A | 12/2013 | |
| CN | 204101480 U * | 1/2015 | G01N 23/00 |
| CN | 104578439 A | 4/2015 | |
| EP | 2 884 292 A1 | 6/2015 | |
| JP | WO 2012086473 A1 * | 6/2012 | B60L 11/182 |

OTHER PUBLICATIONS

Kurs, et.al., "Wireless Power Transfer via strongly coupled Magnetic Resonances," Jul. 6, 2007, Science, vol. 317, Issue 5834, pp. 83-86.*
Yli-Hannuksela, "The transmission line cost calculation," 2011, University of Applied Science, pp. 1-72.*
Merriam-webster, "Definition of Disc," pp. 1-2.*
Zhong, Wenxing et al., General Analysis on the Use of Tesla's Resonators in Domino Forms for Wireless Power Transfer, IEEE Transactions on Industrial Electronics, Jan. 2013, 60(1):261-270, IEEE.
Lee, Chi Kwan et al., Effects of Magnetic Coupling of Nonadjacent Resonators on Wireless Power Domino-Resonator Systems, IEEE Transactions on Power Electronics, Apr. 2012, 27(4):1905-1916, IEEE.
Zhong, W. X. et al., Wireless Power Domino-Resonator Systems With Noncoaxial Axes and Circular Structures, IEEE Transactions on Power Electronics, Nov. 2012, 27(11):4750-4762, IEEE.
Berthiaume, R. et al., Microwave Repeater Power Supply Tapped From the Overhead Ground Wire on 735 kV Transmission Lines, IEEE Transactions on Power Apparatus and Systems, Jan./Feb. 1980, PAS-99(1):183-184, IEEE.
Kurs, André et al., Wireless Power Transfer via Strongly Coupled Magnetic Resonances, Science, Jul. 6, 2007, 317(5834):83-86, 10.1126/science.1143254, American Association for the Advancement of Science, Washington, DC.
Hui, S.Y.R. et al., A Critical Review of Recent Progress in Mid-Range Wireless Power Transfer, IEEE Transactions on Power Electronics, Sep. 2014, 29(9):4500-4511, IEEE.
Supplementary European Search Report dated Jul. 4, 2019 in European Application No. 16865776.5.
International Search Report and Written Opinion dated Jan. 26, 2017 in International Application No. PCT/CN2016/106225.

* cited by examiner

WIRELESS POWER TRANSFER SYSTEM

CROSS-REFERENCE TO RELATED APPLICATION

This application claims priority to and the benefit of U.S. Provisional Patent Application Ser. No. 62/256,726, filed on Nov. 18, 2015, which is incorporated herein by reference in its entirety, including any figures, tables, and drawings.

FIELD OF THE INVENTION

The invention relates to a wireless power transfer system suitable for high voltage power transmission line systems.

BACKGROUND

The Smart Grid and the Internet of Things have prompted active research in recent years to set up online monitoring systems for power transmission systems. Such monitoring systems are particularly important and critical to some regions such as, for example, China, which has suffered several large-scale blackouts in recent years due to heavy snow storms in central and northern China and typhoons in southern China. The 2008 power blackout in China resulted in an estimated total financial loss exceeding 100 billion RMB (approx. US$65 billion). The seriousness of the power blackout problems in China is such that there is a growing body of research in China related to improving online monitoring of power transmission systems using monitoring devices and systems mounted on power transmission system towers.

Online monitoring systems for power transmission towers and cables cover a range of monitoring services such as electric parameters (e.g., voltage, current, phase angle, and power), mechanical parameters (e.g., tower structure, cable galloping, ice/snow thickness, and wind-induced mechanical vibration of transmission tower), thermal parameters (e.g., cable temperature), and weather information (e.g., wind speed, temperature and lightning, and pollution level), as well as anti-theft monitoring.

Some known monitoring systems for high voltage power transmission systems are powered by solar panel units mounted on the power transmission towers. One problem with such a form of power supply is the intermittency of available solar energy, which is exacerbated during prolonged periods of inclement weather, which can lead to depletion of charge in the solar panel unit's batteries and thus the powering down of the monitoring system.

R. Berthiaume and R. Blais, "Microwave repeater power supply tapped from the overhead ground wire on 735 kV transmission lines," IEEE Trans. Power App. Syst., vol. PAS-99, no. 1, pp. 183-184, January/February 1980, discloses a technique in which microwave repeaters are used to transmit power harvested from the high voltage power transmission cables from one point to another.

A. Kurs, A. Karalis, R. Moffatt, J. D. Joannopoulos, P. Fisher, and M. Soljacic, "Wireless power transfer via strongly coupled magnetic resonances," Science, vol. 317, no. 5834, pp. 83-86, July 2007, discloses a mid-range wireless power transfer technique using magnetic resonance. The magnetic resonance wireless power transfer technique disclosed by Kurs adopts the Maximum Power Transfer Principle that has the limitation of poor system efficiency. For any circuit that operates with the Maximum Power Transfer Theorem via impedance matching with the source impedance, there is an inherent limitation that the energy efficiency of the system cannot be higher than 50% For a transmission distance of about 2 meters, the system energy efficiency is at best 15%, as discussed in S. Y. R. Hui, W. X. Zhong and C. K. Lee, "A critical review of recent progress in mid-range wireless power transfer", IEEE Transactions on Power Electronics, Vol. 29, No. 9, September 2014, pp: 4500-4511.

Wireless domino-resonator wireless power transfer systems have been disclosed in:

[1] S. Y. R. Hui and W. X. Zhong, "Apparatus and Method for Wireless Power Transfer", Patent application PCT/IB2011/000050, 14 Jan. 2011;

[2] W. X. Zhong, C. K. Lee and S. Y. R. Hui, "General Analysis on the Use of Tesla's Resonators in Domino Forms for Wireless Power Transfer", IEEE Transactions on Industrial Electronics, Vol. 60, No. 1, January 2013, pp: 261-270;

[3] C. K. Lee, W. X. Zhong and S. Y. R. Hui, "Effects of Magnetic Coupling of Non-adjacent Resonators on Wireless Power Domino-Resonator Systems", IEEE Transactions on Power Electronics, Volume: 27, Issue: 4, 2012, Page(s): 1905-1916; and

[4] W. X. Zhong, C. K. Lee and S. Y. R. Hui, "Wireless Power Domino-Resonator Systems with Non-coaxial axes and Circular Structures", IEEE Transactions on Power Electronics Volume: 27, Issue: 11, 2012, Page(s): 4750-4762.

The wireless domino-resonator systems in [1] to [4] have been practically proven to provide a highly efficient way to transfer wireless power over a few meters. Unlike the Kurs proposal, the wireless domino-resonator systems adopt the Maximum Energy Efficiency Principle and can achieve an overall system energy efficiency higher than 50%. One advantage of the wireless domino-resonator systems is that the resonators can be arranged flexibly to guide the wireless power flow rather than being limited to straight-line power transmission.

In view of the increasing demand for powering online monitoring systems for power transmission towers and transmission lines, there is a need for new insulator structures that can provide (1) high-voltage (HV) insulation and (2) wireless power transfer (WPT) capabilities.

BRIEF SUMMARY

In an embodiment, an insulator device comprises: a body formed of an electrically insulating material, said body defining a cavity; and a resonator coil located within said cavity, said coil being configured for resonant inductive coupling with a similar such coil when placed in the vicinity of the similar such coil.

In another embodiment, an insulator comprises a series of connected insulator devices, a plurality of said series of insulator devices each comprising a body formed of an electrically insulating material, said body defining a cavity, and a resonator coil located within said cavity, said coil being configured for resonant inductive coupling with a similar such coil when placed in the vicinity of the similar such coil, wherein the plurality of insulator devices having a resonator coil are arranged within the series of devices so as to enable the near field transmission of electrical energy from a first end of the series to a second end of the series.

In another embodiment, a wireless power transfer system comprises: an insulator having a series of connected insulator devices, a plurality of said series of insulator devices each comprising a body formed of an electrically insulating material, said body defining a cavity, and a resonator coil located within said cavity, said coil being configured for resonant inductive coupling with a similar such coil when placed in the vicinity of the similar such coil; an energy transmitting coil magnetically coupled to a first resonator coil insulator device of said series of connected insulator devices for wirelessly delivering electrical energy to said first resonator coil insulator device; and an energy receiving coil magnetically coupled to a last resonator coil insulator device of said series of connected insulator devices for wirelessly receiving electrical energy from said last resonator coil insulator device, wherein the plurality of insulator devices having a resonator coil are arranged within the series of devices so as to enable the near field transmission of electrical energy from a first end of the series to a second end of the series.

In another embodiment, a method of monitoring a power transmission line comprises providing the power transmission line with a monitoring apparatus powered by electrical energy harvested from the powerline and transmitted to the monitoring apparatus using a wireless power transfer system as described herein (e.g., the wireless power transfer system of the previous paragraph).

Other aspects of the invention are in accordance with the appended claims.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments, which are provided by way of example only in connection with the accompanying figures, of which.

DETAILED DESCRIPTION

The following description is of preferred embodiments by way of example only and without limitation to the combination of features necessary for carrying the invention into effect.

Figure 1:
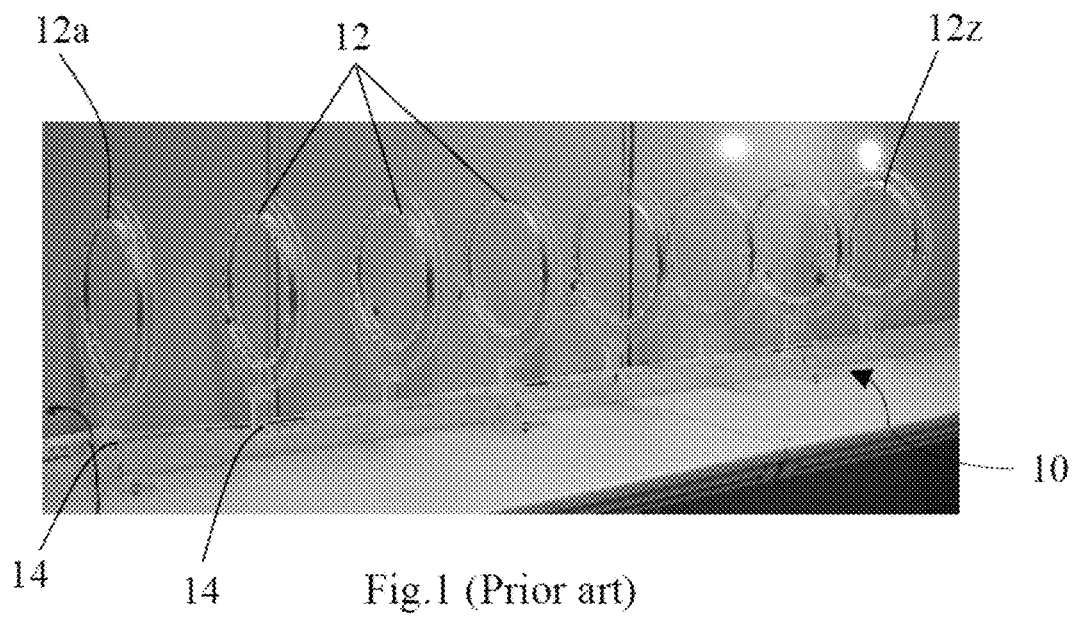
FIG. 1 shows a known straight wireless power domino resonator system.

FIG. 1 shows a known straight wireless power transfer domino resonator system 10 consistent with the disclosures of [1] to [4] above. The system 10 has a plurality of LC resonator coils 12 arranged on supports 14 in a spaced-apart series in a straight line such that adjacent coils 12 become magnetically coupled to wirelessly transfer electrical energy from a first coil 12a in the series to the last coil 12z in the series.

Figure 2:
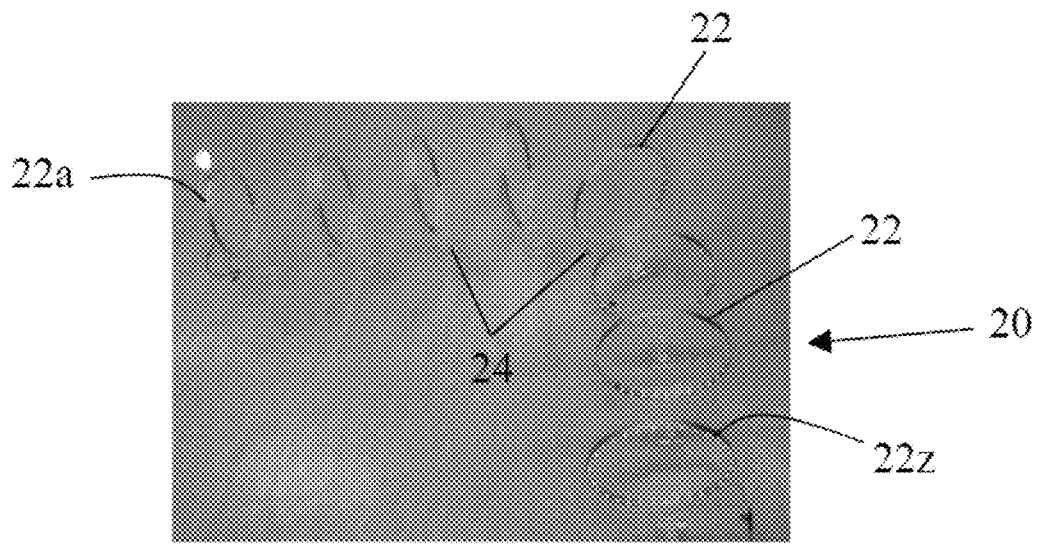
FIG. 2 shows a known curved wireless power domino resonator system.

FIG. 2 shows a known curved wireless power transfer domino resonator system 20 consistent with the disclosures of [1] to [4] above. The system 20 also has a plurality of LC resonator coils 22 arranged on supports 24 in a spaced apart series, but arranged in a curve to illustrate that it is possible for magnetically coupled adjacent coils 22 to wirelessly transfer electrical energy from a first coil 22a in the series to the last coil 22z in the series over a curved pathway.

Figure 3:
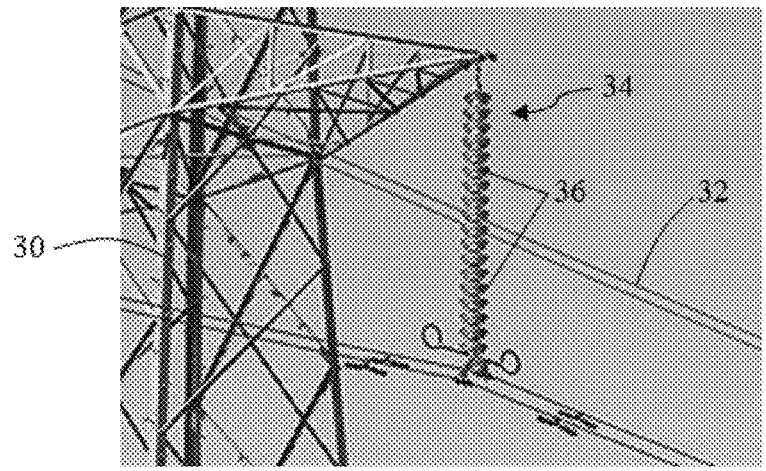
FIG. 3 shows a typical insulator for a high voltage power transmission system tower.
Figure 4A:
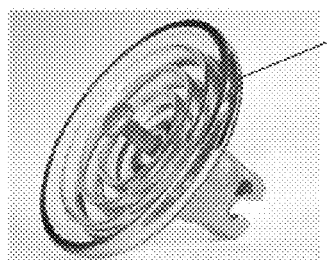
FIGS. 4a and 4b show a known toughened glass insulator disc for a high voltage power transmission system tower and an insulator comprising a series of connected insulator discs, respectively.
Figure 4B:
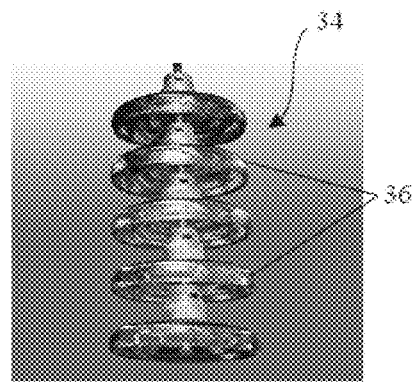

FIG. 3 shows a power transmission line system tower 30 supporting a plurality of high voltage power lines 32 by means of known insulators 34. The insulator 34 comprises a series of connected insulator discs 36 as better seen in FIGS. 4a and 4b and FIGS. 5a and 5b, although these figures merely depict one type of power transmission line system insulator.

Figure 5A:
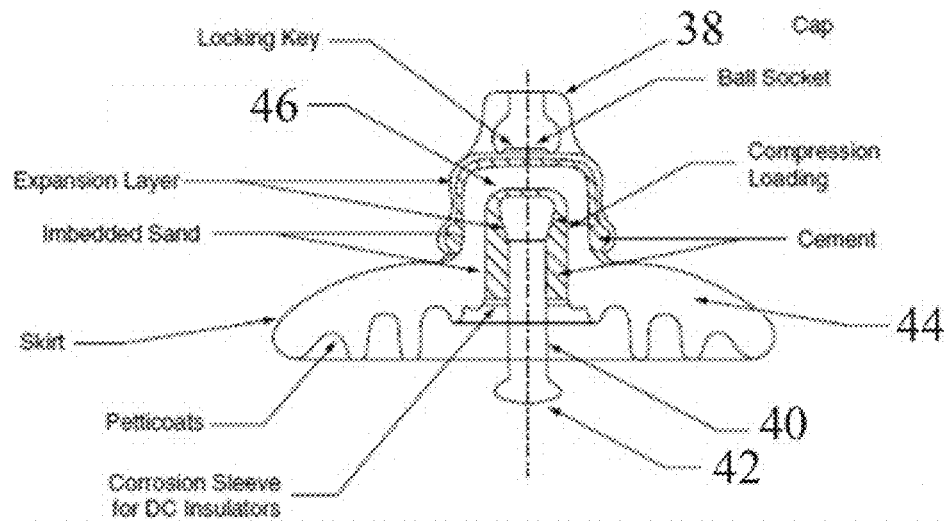
FIGS. 5a and 5b show schematic cross-sectional diagrams of a known insulator disc for a high voltage power transmission system tower and an insulator comprising a series of connected insulator discs, respectively.
Figure 5B:
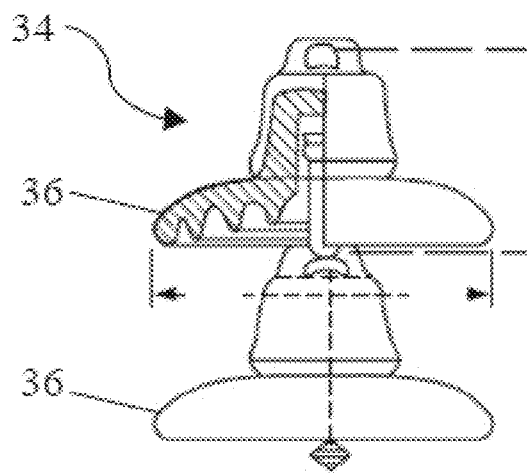

Referring to FIG. 5a, each insulator disc 36 has a cap 38 defining a ball socket, and a central pin 40 having a ball 42 at an exposed end thereof, the central pin 40 being cemented or otherwise affixed in a cavity of a porcelain or glass body 44 where the insulator body 44 has an insulated head 46, which separates and insulates the ball socket from the central pin 40. Referring to FIG. 5b, two insulator discs 36 can be arranged in a series by inserting the ball 42 of one disc 36 into the ball socket of an adjacent disc 36. It will be understood that FIGS. 3 to 5 are merely illustrative of one form of insulator 34 and that others are known, which employ different connection methods, but share the feature that a string of discs 36 forming an insulator 34 provides an insulator 34 that may not only provide insulation for a high voltage power transmission line from other transmission components including the tower, but act as a mechanical device to support a power transmission line.

Embodiments of the subject invention relate to new structures of insulator discs with embedded resonator coils. By linking the insulator discs in a series using an appropriate mechanical mechanism, the insulator discs form an insulator, insulator string, or insulator rod for a high power transmission line system. The resonator coils embedded inside the insulator discs therefore form a series of relay resonators that can be used for wireless power transfer through the principle of near-field magnetic coupling and resonance. Such an insulator string can provide the simultaneous functions of voltage insulation and wireless power transfer over the length of the string or rod. Applications of embodiments of the subject invention are particularly suitable for, but not limited to, wireless power transfer in a high-voltage environment, such as encountered in high-voltage power transmission line systems.

Figure 6:
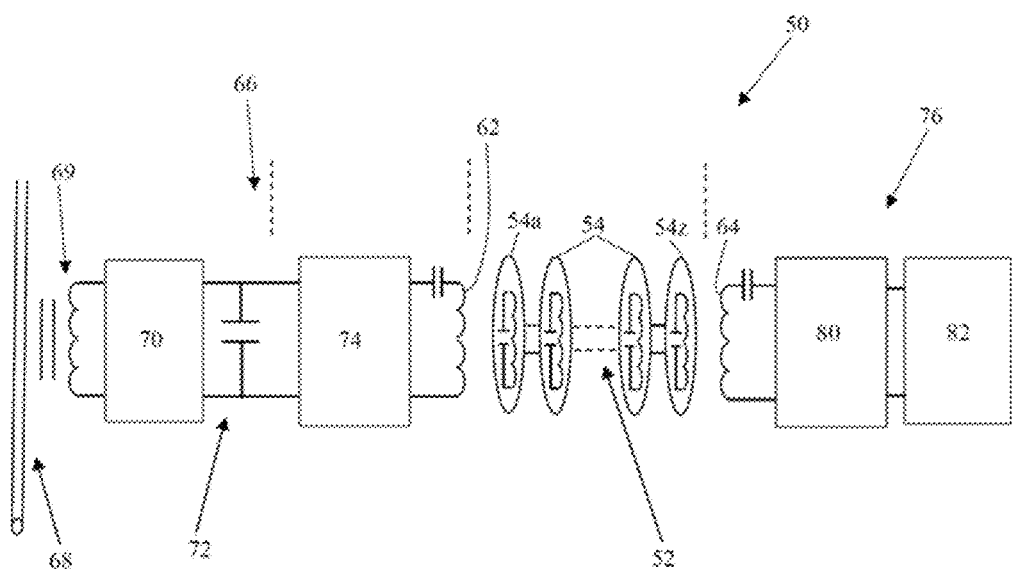
FIG. 6 is a schematic block diagram of a wireless power transfer system in accordance with an embodiment of the subject invention.
Figures 8A, 8B:
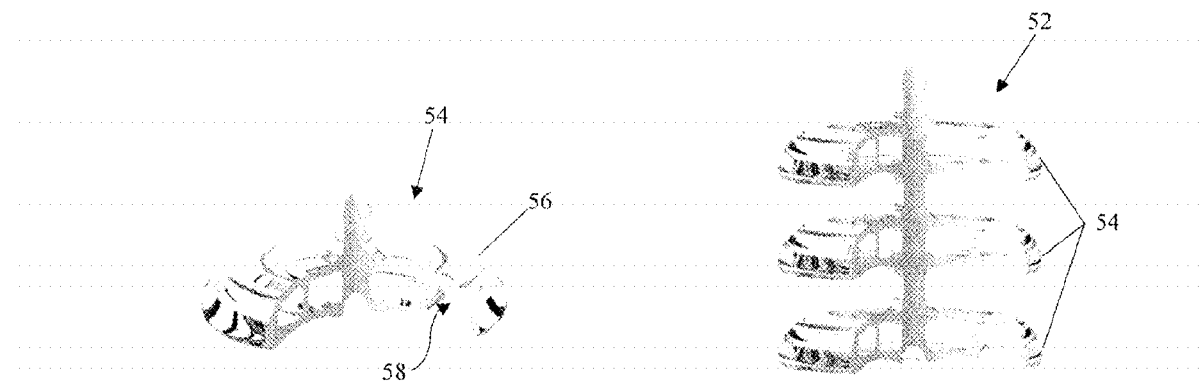
FIGS. 8a and 8b show an insulator disc and an insulator comprising a series of connected insulator discs, respectively, in accordance with an embodiment of the subject invention.

FIG. 6 provides a schematic block diagram of a wireless power transfer system 50 according to an embodiment of the subject invention. The system 50 comprises an insulator 52 formed from a series of connected insulator devices, e.g., insulator discs 54. A plurality of said series of insulator devices 54 may, as shown in FIG. 8a, each comprise a body 56 formed of an electrically insulating material, said body 56 defining a cavity 58. A resonator coil 60 is located within the cavity 58 with said coil 60 being configured for resonant inductive coupling with a similar such coil when placed in the vicinity of the similar such coil. The plurality of insulator devices 54 having an embedded resonator coil 60 may comprise a subset of the series of insulator devices such that not all insulator devices or discs in a series include a resonator coil 60. However, in many embodiments, all of the insulator discs 54 are provided with a resonator coil 60.

The wireless power transfer system 50 can include an energy transmitting coil 62 magnetically coupled to a first resonator coil insulator device 54a of said series of connected insulator devices for wirelessly delivering electrical energy to said first resonator coil insulator device 54a. Also provided is an energy receiving coil 64 magnetically coupled to a last resonator coil insulator device 54z of said series of connected insulator devices for wirelessly receiving electrical energy from said last resonator coil insulator device 54z. The plurality of insulator devices 54 having a resonator coil 60 are arranged within the series of devices so as to enable the near field transmission of electrical energy from a first end of the series to a second end of the series and vice-versa in some systems, i.e., the system 10 could be configured to be bi-directional.

The energy transmitting resonator coil 62 comprises a part of an energy harvesting circuit 66 that is configured to wirelessly harvest energy from a high voltage power transmission line 68 using a transformer (or an magnetically coupled device) 69. The energy harvesting circuit 66 may in some embodiments comprise an alternating current (AC) to direct current (DC) power converter 70 for charging one or more batteries or capacitors 72 and for feeding a DC to AC inverter 74. The DC to AC inverter 74 can be configured to provide a high frequency AC signal for driving the energy transmitting coil 62. The mains frequency of 50 Hertz (Hz) may be up-converted by the energy harvesting circuit 66 to a frequency of typically higher than 20,000 Hz for driving the energy transmitting resonator coil 62.

The energy receiving resonator coil 64 comprises part of an energy receiver circuit 76, which may include in some embodiments a high frequency AC to DC (or AC to AC) converter 80 for providing a supply voltage or current at levels suitable for powering monitoring apparatuses 82, which are configured to provide monitoring services such as electric parameters (e.g., voltage, current, phase angle, and power), mechanical parameters (e.g., tower structure, cable galloping, ice/snow thickness, and wind-induced mechanical vibration of transmission tower), thermal parameters (e.g., cable temperature), and/or weather information (e.g., wind speed, temperature and lightning, and pollution level), as well as anti-theft monitoring.

The series of connected insulator devices 54 comprising the insulator 52 define a wireless power transfer domino-resonator system, which is configured to direct the flow of electrical energy from the first end of the series to the second end of the series by means of near field transmission of electrical energy from one end of the series to the other end of the series.

It will be understood that it is preferred that the insulator 52 is configured as an insulator for a high voltage power transmission system, but this is not an essential requirement of embodiments of the subject invention. In some embodiments, the insulator 52 is configured to support a power transmission cable. In many embodiments, the structures of the insulator 52 and the insulator discs 54 are changed as explained in more detail below, such that the insulator 52 may not be employed as a transmission line support device.

In some embodiments, the resonator coils 60 embedded inside the plurality of insulator devices 54 are identical for optimal transmission of electrical energy from the first end of the series to the second end of the series, and the plurality of insulator devices 54 is arranged with a distance between adjacent resonator coil insulator devices such that a mutual coupling factor between adjacent devices is sufficiently large for optimal or efficient transmission of electrical energy from the first end of the series to the second end of the series, preferably with said distance being similar or less than a size of the diameter of an embedded resonator coil 60. The distance between adjacent resonator coil insulator devices is preferably the same or substantially the same. The distance between the energy transmitting coil 62 and first resonator coil insulator device 54a of said series of connected insulator devices may be smaller than the distance between adjacent resonator coil insulator devices 54. Similarly, the distance between the energy receiving coil 64 and last resonator coil insulator device 54z of said series of connected insulator devices may be smaller than the distance between adjacent resonator coil insulator devices 54.

In some embodiments of the subject invention, the resonator coil can include one or more ferromagnetic materials in the resonator coil (e.g., in the center of the resonator coil). Such materials can focus the magnetic flux path. Also, such ferromagnetic materials can behave like a magnetic core in the inner region (e.g., central region) of the resonator coil. The ferromagnetic materials can include, for example, one or more soft ferrite materials, though embodiments are not limited thereto.

Figure 7:
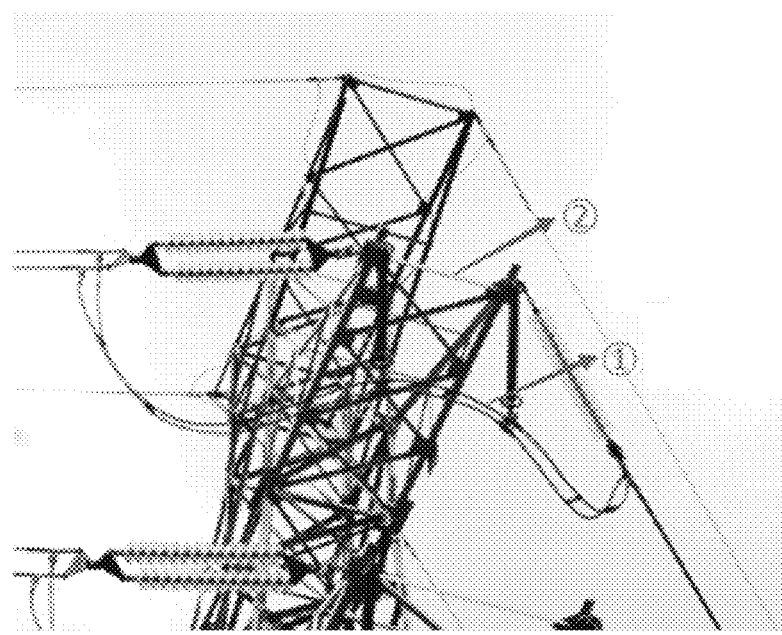
FIG. 7 shows an energy harvesting point and an energy receiving point on a high voltage power transmission system tower for a wireless power transfer system in accordance with an embodiment of the subject invention.

Referring to FIG. 7, an application of the present invention can be further illustrated by reference to an example of a standard power transmission system tower. The magnetic field generated by the transmission cable (marked as ① in FIG. 7) can be "continuously" harvested with a transformer and a power converter comprising the energy harvesting circuit 68 of FIG. 6. The harvested energy can be stored in one or more supercapacitors and/or rechargeable batteries (72 in FIG. 6). Because energy can be harvested from the power cable continuously without any time constraint (such as daytime only for solar panels), the storage capacity of the supercapacitor and/or battery 72 is expected to be much smaller than that for a solar power system. As the online monitoring system has to be mounted on the power transmission system tower (marked as ② in FIG. 7), which is earthed, there is a considerable transmission distance between the energy-harvesting point ① and the energy-receiving point ②.

According to IEC 60137 International Standard, Fifth edition, 2003, "Insulated bushings for alternating voltages above 1000V, the creepage distance depends on the voltage and the air pollution conditions as listed in Table 1 below:

TABLE 1

IEC 60137 Standard on Creepage Distance for Voltage > 1000 V

| Condition | Creepage |
| --- | --- |
| Normal | 16 mm/kV |
| Medium pollution | 20 mm/kV |
| Heavy pollution | 25 mm/kV |
| Very Heavy Pollution | 31 mm/kV |

For a medium polluted condition and a transmission line voltage of 110 kiloVolts (kV), the creepage distance for wireless power transmission has to be at least 2.2 meters (m). Referring again to FIG. 3, which shows an example of a known insulator string holding the high voltage transmission line to the transmission tower, for transmission distances of this magnitude, traditional wireless power transmission techniques cannot achieve high efficiency (typically <15%) because such efficiency is inversely proportional to the transmission distance.

Embodiments of the subject invention address this problem through use of the disclosed novel insulator string or rod 52.

Referring again to FIGS. 8a and 8b, the resonator can comprise a coil connected in parallel with a resonator capacitor to form an inductive-capacitor resonator tank whereby a resonance frequency of the resonator coil is determined by the values of the inductor and the capacitor.

The electrically insulating material preferably comprises a material rated for use in high voltage power transmission systems.

Figure 9:
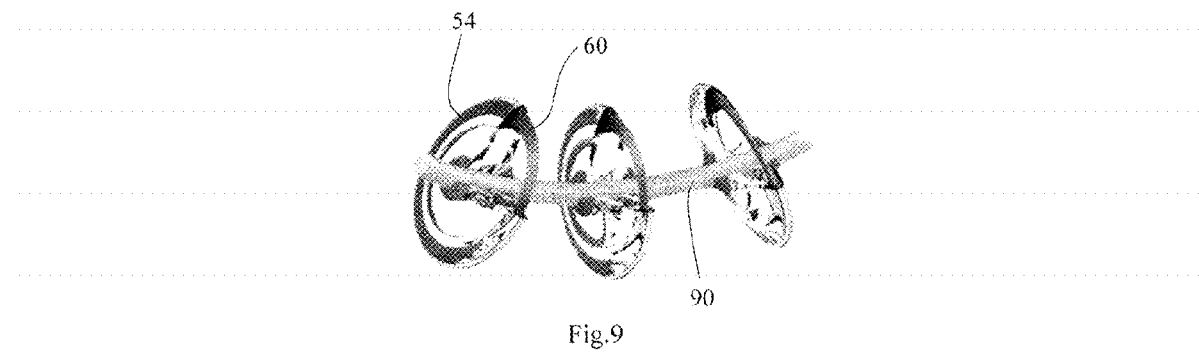
FIG. 9 shows part of a flexible insulator comprising a series of insulator discs with a section of each insulator disc removed to show an embedded resonator coil therewithin in accordance with an embodiment of the subject invention.

The insulator or insulator string 52 may connect the insulator devices or discs 56 by a rigid insulator shaft as shown in FIG. 8b or by a flexible insulator shaft as shown in FIG. 9.

The transmitter resonator coil 62 can be arranged in such a way that it is placed close to and magnetically coupled to the first resonator coil 54a in the series of insulator discs 54 on the transmitter side. Similarly, the last resonator coil 54z in the series of insulator discs 54 of the insulator rod or string can be placed close to the receiver resonator coil 64 for close magnetic coupling. The operation of the proposed insulator rod/string is based on the wireless domino-resonator systems of FIGS. 1 and 2. Based on the short-range magnetic resonance technique of [1] to [4], it has been shown that this approach is a good compromise of high energy efficiency and transmission distance.

It is important to note that the disclosed embodiments of the high voltage insulators (rods or strings) may have different functions when compared with traditional high voltage insulators. Traditional ones, such as those shown in FIGS. 3 to 5 are designed to provide the simultaneous functions of (i) mechanical support and (ii) high voltage insulator. The novel ones disclosed herein offer the simultaneous functions of (i) wireless power transmission over the creepage distance and (ii) high voltage insulation.

As described above, FIGS. 5a and 5b show the typical structure of a stackable insulator disc and its stacked-up structure, respectively. Because mechanical support is not a key function of the invention, the metallic pin and ball structures used for stacking up the discs in the traditional high voltage insulator rods can be replaced by non-metallic insulator materials.

Figure 10:
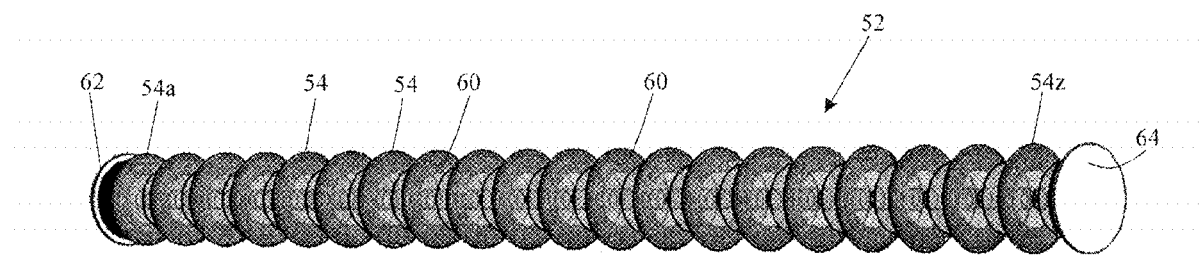
FIG. 10 depicts an insulator for a high voltage power transmission tower in accordance with an embodiment of the subject invention.

In embodiments of the subject invention, a first insulator disc structure (FIG. 8) can be similar to the traditional one as shown in FIG. 5. It can have a stackable structure like the traditional one, except that the metallic pin and ball are replaced with electrical insulating materials. This is best seen in FIG. 8a. When stacked up in series (FIG. 8b), these stackable discs form an insulator rod with wireless power transfer capability. The second disc structure for the invention is shown in FIG. 9 and has a through-hole in its center for receiving a flexible shaft 90. The flexible shaft can be made of flexible insulating materials such as cross-linked polyethylene (XLPE or PEX) and/or polyvinyl chloride (PVC). The insulator discs 54 with embedded LC resonators can be mounted along this flexible insulating shaft. To facilitate a standard approach, the distance between adjacent insulator discs should preferably be the same (or substantially the same) as shown in FIG. 10. However, it is possible to optimize the power flow if the distance between the last two discs at each end of the insulator string is slightly different from the separation distance of the discs in the central portion of the string.

The insulator material for the discs can be of different types suitable for high voltage applications. Non-limiting examples are toughened glass, glazed porcelain, and polymer. In embodiments of the subject invention, while the series-connected insulator discs provide a high-voltage insulator, the series of coil-resonators provide a wireless power transfer path because these coil-resonators behave like a series of relay coil-resonators as in [1] to [4].

In general, embodiments of the subject invention relate to new structures of insulator discs with embedded resonator coils. By linking the insulator discs in a series using an appropriate mechanical mechanism, the insulator discs form an insulator or insulator string for a high power transmission line system. The resonator coils embedded inside the insulator discs therefore form a series of relay resonators that can be used for wireless power transfer through the principle of near-field magnetic coupling and resonance. Such an insulator string can provide the simultaneous functions of voltage insulator and wireless power transfer over the length of the string. Applications of embodiments of the subject invention are particularly suitable for, but not limited to, wireless power transfer in a high-voltage environment, such as encountered in high-voltage power transmission line systems.

Reference in this specification to "one embodiment" or "an embodiment" means that a particular feature, structure, or characteristic described in connection with the embodiment is included in at least one embodiment of the invention. The appearances of the phrase "in one embodiment" or "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described that may be requirements for some embodiments but not other embodiments.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function.

The invention as defined by such claims resides in the fact that the functionalities provided by the various recited means are combined and brought together in the manner which the claims call for. It is thus regarded that any means that can provide those functionalities are equivalent to those shown herein.

REFERENCES

[1] S. Y. R. Hui and W. X. Zhong, "Apparatus and Method for Wireless Power Transfer", Patent application PCT/M2011/000050, 14 Jan. 2011;

[2] W. X. Zhong, C. K. Lee and S. Y. R. Hui, "General Analysis on the Use of Tesla's Resonators in Domino Forms for Wireless Power Transfer", IEEE Transactions on Industrial Electronics, Vol. 60, No. 1, January 2013, pp: 261-270;

[3] C. K. Lee, W. X Zhong and S. Y. R. Hui, "Effects of Magnetic Coupling of Non-adjacent Resonators on Wireless Power Domino-Resonator Systems", IEEE Transactions on Power Electronics, Volume: 27, Issue: 4, 2012, age(s): 1905-1916; and

[4] W. X. Zhong, C. K. Lee and S. Y. R. Hui, "Wireless Power Domino-Resonator Systems with Non-coaxial axes and Circular Structures", IEEE Transactions on Power Electronics Volume: 27, Issue: 11, 2012, Page(s): 4750-4762.

[5] R. Berthiaume and R. Blais, "Microwave repeater power supply tapped from the overhead ground wire on 735 kV transmission lines," IEEE Trans. Power App. Syst., vol. PAS-99, no. 1, pp. 183-184, January/February 1980.

[6] A. Kurs, A. Karalis, R. Moffatt, J. D. Joannopoulos, P. Fisher, and M. Soljacic, "Wireless power transfer via strongly coupled magnetic resonances," Science, vol. 317, no. 5834, pp. 83-86, July 2007.

[7] S. Y. R. Hui, W. X. Zhong and C. K. Lee, "A critical review of recent progress in mid-range wireless power transfer", IEEE Transactions on Power Electronics, Vol. 29, No. 9, September 2014, pp: 4500-4511.

What is claimed is:

1. An insulator device, comprising:
a first insulator disc comprising a first body formed of a first electrically insulating material and defining a first cavity;
a second insulator disc comprising a second body formed of a second electrically insulating material and defining a second cavity;
a first resonator coil located within the first cavity, embedded in the first body;
a second resonator coil located within the second cavity, embedded in the second body, wherein the first resonator coil is configured for resonant inductive coupling with the second resonator coil when the first resonator coil is in a vicinity of the second resonator coil; and
a shaft connected to a center of the first body and a center of the second body,
wherein the first insulator disc is physically spaced apart from the second insulator disc, and
wherein the insulator device is wirelessly coupled to a circuit to transmit electrical energy from a high voltage power transmission system having a voltage larger than 1,000 V.

2. The insulator device of claim 1, wherein the first resonator coil comprises a coil connected in parallel with a resonator capacitor to form an inductive-capacitor resonator tank such that a resonance frequency of the inductive-capacitor resonator bank is determined by an inductance of the coil and a capacitance of the resonator capacitor.

3. The insulator device of claim 1, wherein the first electrically insulating material is the same as the second electrically insulating material and comprises a material rated for use in the high voltage power transmission system having the voltage larger than 1,000 V.

4. The insulator device of claim 1, comprising an insulator string comprising a series of connected insulator discs including the first insulator disc and the second insulator disc.

5. The insulator device of claim 1, wherein the first cavity of the first body of the first insulator disc is sealed, and
wherein the second cavity of the second body of the second insulator disc is sealed.

6. The insulator device of claim 1, wherein the first body of the first insulator disc comprises first means for connecting the first insulator disc to the shaft, and
wherein the second body of the second insulator disc comprises second means for connecting the second insulator disc to the shaft.

7. The insulator device of claim 1, wherein the first body has means provided on top and bottom surfaces thereof for connecting the first insulator disc respectively to two adjacent insulator discs.

8. The insulator device of claim 1, wherein the first resonator coil comprises at least one ferromagnetic material component in a central region thereof, and wherein the shaft is flexible.

9. An insulator, comprising:
a series of connected insulator discs, which includes a plurality of insulator discs, each insulator disc of the plurality of insulator discs comprising a body formed of an electrically insulating material and defining a cavity, and a resonator coil located within the cavity, embedded in the body, and configured for resonant inductive coupling with a second resonator coil located in a second cavity of a second insulator disc when the resonator coil is placed in a vicinity of the second resonator coil; and
a shaft connecting the plurality of insulator discs,
wherein each insulator disc of the plurality of insulator discs having the resonator coil is arranged within the series of connected insulator discs so as to enable a near field transmission of electrical energy from a first end of the series of connected insulator discs to a second end of the series of connected insulator discs, and
wherein each insulator disc of the plurality of insulator discs is physically spaced apart from every other insulator disc of the plurality of insulator discs, and
wherein the insulator is wirelessly coupled to a circuit to transmit the electrical energy from a high voltage power transmission system having a voltage larger than 1,000 V.

10. The insulator of claim 9, wherein the plurality of insulator discs comprises all of the insulator discs of the series of connected insulator discs.

11. The insulator of claim 9, wherein the series of connected insulator discs comprises a wireless power transfer domino-resonator system to direct a flow of the electrical energy from the first end of the series of connected insulator discs to the second end of the series of connected insulator discs.

12. The insulator of claim 9, wherein in the plurality of insulator discs, each insulator disc of the plurality of insulator discs having the resonator coil is arranged within the series of connected insulator discs so as to enable the near field transmission of the electrical energy from the second end of the series of connected insulator discs to the first end of the series of connected insulator discs.

13. The insulator of claim 9, wherein the insulator is configured to mechanically support a power transmission cable.

14. The insulator of claim 9, wherein the resonator coils embedded inside the plurality of insulator discs are identical for an optimal transmission of the electrical energy from the first end of the series of connected insulator discs to the second end of the series of connected insulator discs.

15. The insulator of claim 9, wherein a distance between adjacent insulator discs is less than a diameter of the resonator coil embedded in the cavity such that a mutual coupling factor between the adjacent insulator discs is large enough for an efficient transmission of the electrical energy from the first end of the series of connected insulator discs to the second end of the series of connected insulator discs.

16. The insulator of claim 9, wherein the resonant coil in each insulator disc of the plurality of insulator discs comprises at least one ferromagnetic material component in a central region thereof, and wherein the shaft is flexible.

17. A wireless power transfer system, comprising:
the insulator according to claim 9;
an energy transmitting coil magnetically coupled to a first resonator coil of a first insulator disc of the plurality of insulator discs, disposed at the first end of the series of connected insulator discs, for wirelessly delivering the electrical energy to the first resonator coil of the first insulator disc; and
an energy receiving coil magnetically coupled to a second resonator coil of a second insulator disc of the plurality of insulator discs, disposed at the second end of the series of connected insulator discs, for wirelessly receiving the electrical energy from the second resonator coil of the second insulator disc.

18. The wireless power transfer system of claim 7, wherein the energy transmitting coil comprises a part of an energy harvesting circuit that is configured to wirelessly harvest the electrical energy from a high voltage power transmission line having a voltage larger than 1,000 V.

19. The wireless power transfer system of claim 18, wherein the energy harvesting circuit is configured to convert the electrical energy harvested into a high frequency AC signal having a frequency higher than 20,000 Hz for driving the energy transmitting coil.

20. The wireless power transfer system of claim 7, wherein the energy receiving coil comprises a part of a circuit configured to convert a received high frequency AC signal having a frequency higher than 20,000 Hz into a voltage or current output suitable for powering one or more monitoring apparatuses for a power transmission system.

21. The wireless power transfer system of claim 7, wherein the resonator coil in each insulator disc of the plurality of insulator discs comprises at least one ferromagnetic material component in a central region thereof, and wherein the shaft is flexible.

* * * * *